United States Patent [19]

Heckmann

[11] Patent Number: 4,673,291
[45] Date of Patent: Jun. 16, 1987

[54] METHOD OF AND DEVICE FOR MEASURING THE ATTENUATION IN OPTICAL WAVEGUIDES

[75] Inventor: Siegfried Heckmann, Wuppertal, Fed. Rep. of Germany

[73] Assignee: U.S. Philips Corporation, New York, N.Y.

[21] Appl. No.: 747,533

[22] Filed: Jun. 21, 1985

[30] Foreign Application Priority Data

Jul. 12, 1984 [DE] Fed. Rep. of Germany ....... 3425671

[51] Int. Cl.$^4$ ..................... G01N 21/84; G01N 21/59
[52] U.S. Cl. .................................... 356/73.1; 356/433
[58] Field of Search ............................... 356/73.1, 433

[56] References Cited

U.S. PATENT DOCUMENTS

| Re. 31,524 | 2/1984 | Hoebel | 307/149 |
|---|---|---|---|
| 2,907,021 | 9/1959 | Woods | 340/347 |
| 3,110,894 | 11/1963 | Murgio | 340/347 |
| 3,422,423 | 1/1969 | Kaszynski et al. | 340/347 |
| 3,447,149 | 5/1969 | Groth | 340/347 |
| 3,603,977 | 9/1971 | Szabo et al. | 340/347 |
| 3,754,233 | 8/1973 | Sutherland | 340/347 |
| 3,943,452 | 3/1976 | Zitelli | 328/71 |
| 3,944,949 | 3/1976 | Herzog | 332/14 |
| 3,999,388 | 12/1976 | Nystrom | 60/521 |
| 4,095,218 | 6/1978 | Crouse | 340/347 |
| 4,604,517 | 8/1986 | Barry | 219/494 |

FOREIGN PATENT DOCUMENTS

| 2819979 | 11/1979 | Fed. Rep. of Germany | 356/73.1 |
|---|---|---|---|
| 131033 | 8/1982 | Japan | 356/73.1 |

*Primary Examiner*—Vincent P. McGraw
*Attorney, Agent, or Firm*—Marc D. Schechter

[57] ABSTRACT

The attenuation of an optical waveguide is measured by comparing the light power input into the waveguide with the light power output from the waveguide. The input power is encoded on the light signal by pulse frequency modulation. The output power is measured by a light receiver.

10 Claims, 1 Drawing Figure

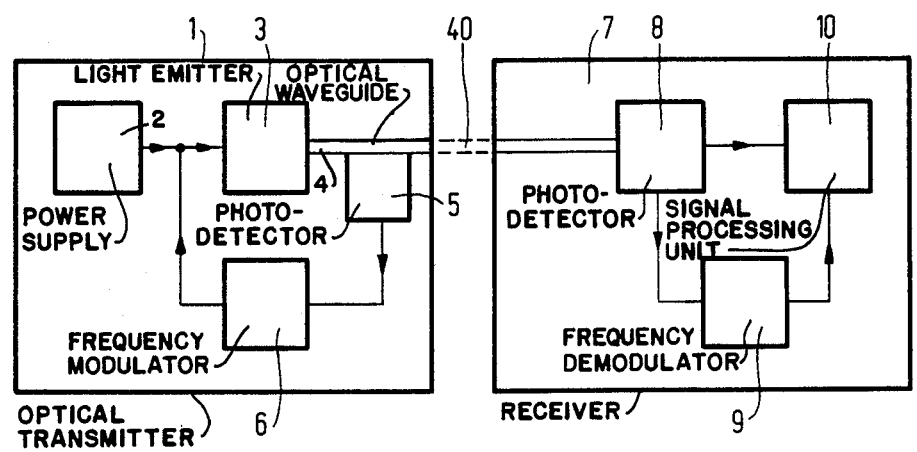

METHOD OF AND DEVICE FOR MEASURING THE ATTENUATION IN OPTICAL WAVEGUIDES

BACKGROUND OF THE INVENTION

The invention relates to a method of measuring the attenuation in optical waveguides. A light transmitter feeds energy into the waveguide, and a receiver receives the light output from the end of the waveguide. The transmitter radiates light pulses into the waveguide and the receiver receives the light as an average value.

To measure the attenuation of optical wave-guides, it is known to measure the output power of a light transmitter in the input of the fiber, to switch the optical fiber to be measured into the circuit, and to repeat the measuring operation. The resultant level change is a measure of the attenuation of the optical fiber. This method is particularly suitable for use during measurements on single waveguide conductors and on cables during and after fabrication.

Another known method is commonly referred to as the cut-back method, in which the optical fiber to be measured is connected to a coupling fiber, and the light output at the fiber end is determined with the aid of a systems receiver. Then, the optical fiber to be measured is cut in the region of the coupling fiber, and the optical power transmitted through this cut off short section is measured. The attenuation in the optical fiber can be determined from the resultant power difference between these two measurements.

If very accurate measurements are desired, then one must check during the measuring operation whether the transmitter power fluctuates. Particularly when the two measurements are made at different times, the transmitter power fed into the fiber may change, so that the measuring results do not accurately correspond to the actual attenuation value.

One may consider monitoring, when measuring the optical power out of the fiber, the transmitter power fed into the fiber and to transmit the data to the receiving station when the transmitter and the receiver are located in positions remote from each other, for example in the case of a cabled network.

It is alternatively possible to arrange a reference line in parallel with the installed cables to be measured, and to feed the same amount of energy into these two lines. The attenuation of the reference line being known, the attenuation of the cables to be measured can be properly determined, even when the transmitter power fluctuates.

The above-mentioned, known or proposed methods either produce inaccurate results, or require considerable design effort and cost, or cannot be implemented under certain circumstances, for example because it is not possible to install an additional reference line in the section to be measured.

SUMMARY OF THE INVENTION

It is an object of the invention to provide a method and a device for very accurately measuring the attenuation in optical waveguides despite fluctuations in the transmitter power.

According to the invention, this object is accomplished by measuring the light output power radiated by the transmitter in the immediate region of the transmitter, and by changing the pulse length in accordance with changes in the transmitter output power, while maintaining the average light output, constant (e.g. by pulse frequency modulating the transmitter output. The transmitter output thus encoded is picked up by a decoding arrangement at the receiver.

It is advantageous to measure the transmitter power behind the place where the transmitter is coupled into the waveguide, as this eliminates insertion losses. Modulating the transmitter power according to the invention does not change the average transmitter power, and consequently does not change the average value of the received power.

Constant average power is obtained by feeding light pulses into the fiber with different pulse lengths and corresponding intervals. A given pulse length or a signal which is encoded by different pulse lengths, for example digitally, is then a measure of the transmitter power. Each change in the transmitter power is expressed as a change in the pulse lengths and the associated intervals. This mode of encoding to analogous to frequency modulation. The signal can be demodulated in the receiver in a similar manner as for frequency demodulation.

Efficiently, the receiver is provided with devices which measure the transmitter and receiver powers. These powers can be displayed by separate indicator elements. It is, however, advantageous to directly compare the received light output to the transmitted light output and to directly display the resultant attenuation of the waveguide.

BRIEF DESCRIPTION OF THE DRAWING

FIG. 1 schematically shows a device for measuring the attenuation of an optical fiber according to the invention.

DESCRIPTION OF THE PREFERRED EMBODIMENTS

An optical transmitter 1 comprises a stationary electric power supply 2, a light emitter 3, for example a laser diode, a coupling optical fiber 4, a photodetector 5, and a frequency modulator 6. The photodetector 5 is arranged subsequent to the coupling, not shown, between the waveguide 40 to be measured and coupling fiber 4.

Depending on the transmitter light output picked up by the photodetector, the power to the diode 3 is controlled via the frequency modulator 6 to set a corresponding pulse length to encode the transmitter power.

The receiver 7 comprises a photodetector 8, a frequency demodulator 9, and a signal processing unit 10.

The light power received by the photodetector 8 via the waveguide 40 whose attenuation is to be measured generates an output signal in photodetector 8. This output signal is processed in the signal processing unit 10 and is displayed. Simultaneously, the actual transmitter power is determined via the frequency demodulator which generates an output signal which is also applied to the signal processing unit 10. This enables the unit 10 to determine the difference between the transmitted power and the received power and to display it as the attenuation.

What is claimed is:

1. A method of measuring the attenuation of an optical waveguide, said method comprising the steps of:
   injecting a light signal into a first end of an optical waveguide, said light signal passing through the waveguide and out a second end of the waveguide;
   measuring the average input power of the light signal in the vicinity of the first end of the waveguide;

modulating the light signal, before it enters the first end of the waveguide, as a function of the measured average input power of the light signal, said modulated light signal having a substantially constant average input power;

measuring the average output power of the light signal at the second end of the waveguide;

demodulating the light signal at the second end of the waveguide to determine the average input power; and comparing the demodulated measured average input power with the measured average output power and calculating the attenuation of the waveguide.

2. A method as claimed in claim 1, characterized in that the light signal is modulated before its average input power is measured.

3. A method as claimed in claim 2, characterized in that:

the light signal comprises light pulses having lengths; and the step of modulating the light signal comprises changing the lengths of the light pulses as a function of the measured average input power of the light signal.

4. A method as claimed in claim 3, further comprising the step of displaying the measured average output power and the demodulated measured average input power.

5. A method as claimed in claim 1, further comprising the step of displaying the calculated attenuation of the waveguide.

6. A device for measuring the attenuation of an optical waveguide, said device comprising:

means for injecting a light signal into a first end of an optical waveguide, said light signal passing through the waveguide and out a second end of the waveguide;

means for measuring the average input power of the light signal in the vicinity of the first end of the waveguide;

means for modulating the light signal, before it enters the first end of the waveguide, as a function of the measured average input power of the light signal, said modulated light signal having a substantially constant average input power;

means for measuring the average output power of the light signal at the second end of the waveguide;

means for demodulating the light signal at the second end of the waveguide to determine the average input power; and means for comparing the demodulated measured average input power with the measured average output pwer and for calculating the attenuation of the waveguide.

7. A device as claimed in claim 6, characterized in that the light signal is modulated before its average input power is measured.

8. A device as claimed in claim 7, characterized in that:

the light signal comprises light pulses having lengths; and the means for modulating the light signal comprises means for changing the lengths of the light pulses as a function of the measured average input power of the light signal.

9. A device as claimed in claim 8, further comprising means for displaying the demodulated measured average input power.

10. A device as claimed in claim 8, further comprising means for displaying the calculated attenuation of the waveguide.

* * * * *

UNITED STATES PATENT AND TRADEMARK OFFICE
CERTIFICATE OF CORRECTION

PATENT NO. : 4,673,291

DATED : June 16, 1987

INVENTOR(S) : Siegfried Heckmann

It is certified that error appears in the above-identified patent and that said Letters Patent is hereby corrected as shown below:

Claim 6, line 22 (column 4, line 18) "pwer" should read --power--.

Signed and Sealed this

Sixth Day of October, 1987

Attest:

DONALD J. QUIGG

Attesting Officer

Commissioner of Patents and Trademarks